UNITED STATES PATENT OFFICE.

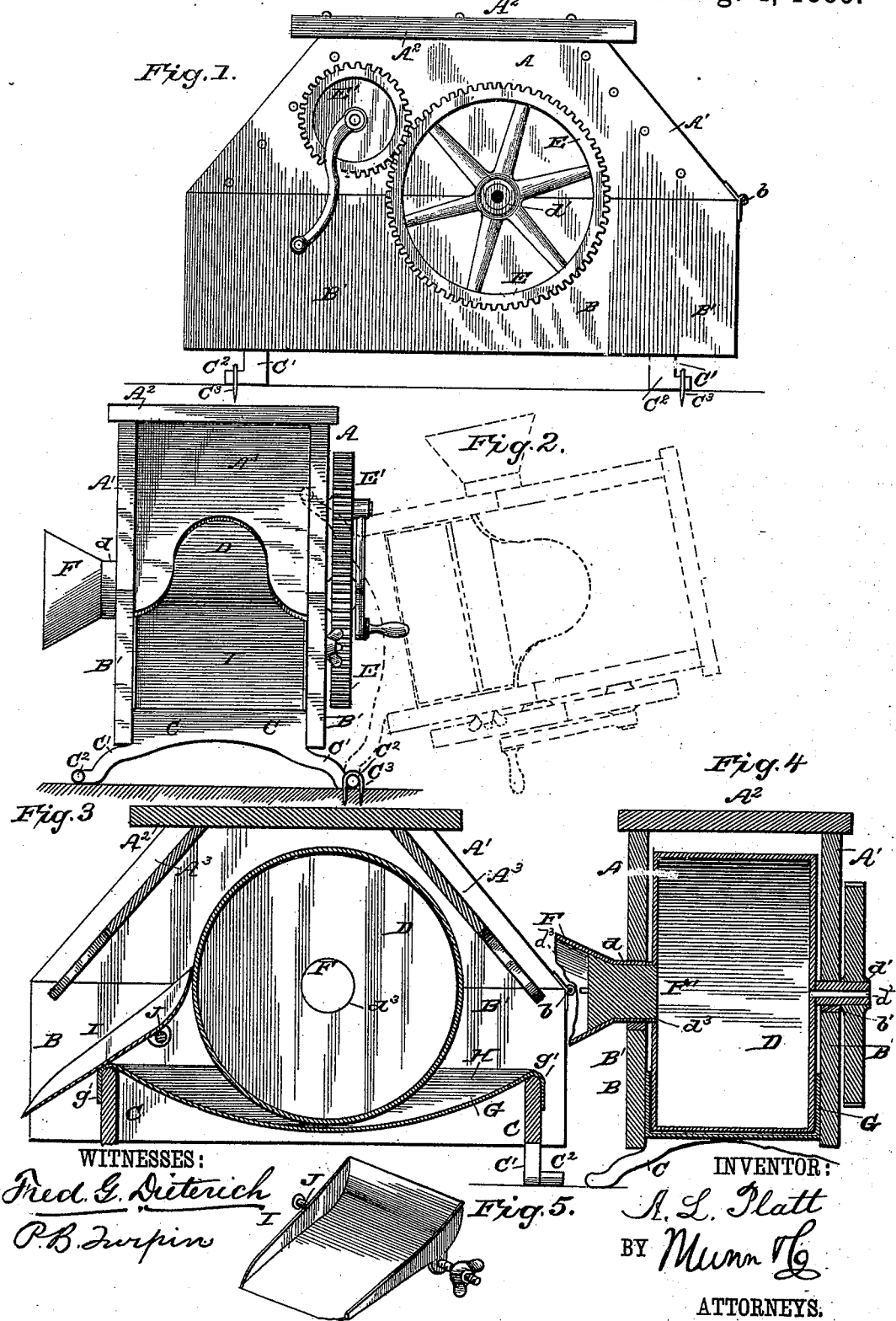

ALBERT L. PLATT, OF BOWLING GREEN, MISSOURI, ASSIGNOR TO WILLIAM B. McALISTER, JAMES R. McALISTER, AND JAMES M. HAWKINS, ALL OF SAME PLACE.

ICE-CREAM FREEZER.

SPECIFICATION forming part of Letters Patent No. 323,732, dated August 4, 1885.

Application filed May 1, 1885. (No model.)

*To all whom it may concern:*

Be it known that I, ALBERT L. PLATT, a citizen of the United States, residing at Bowling Green, in the county of Pike and State of Missouri, have invented certain new and useful Improvements in Ice-Cream Freezers, of which the following is a description.

This invention is an improvement in ice-cream freezers, and has for an object to provide a simple construction of freezer in which the cream or other article it is desired to freeze may be quickly frozen and discharged from the machine, and in which the several parts will be conveniently detachable for the purpose of repairing, replacing, and cleansing.

The invention consists in certain novel constructions, combinations, and arrangements of parts, as will be hereinafter first fully described, and then pointed out in the claims.

In the drawings, Figure 1 is a side view of my machine. Fig. 2 is an end elevation with dotted motion. Fig. 3 is a vertical longitudinal section. Fig. 4 is a central transverse section of the machine, and Fig. 5 is a detail view of the scraper and its clamping-bolt removed from the machine.

The framing of my machine is preferably formed in two sections—an upper one, A, and a lower one, B, preferably hinged together at one end, $b$, as shown. The top section is formed with side boards, A', and top board, A², and may, when desired, have end boards, A³. The lower edges are provided midway their ends with half-round notches $a$, which fit over the trunnions of the cylinder.

The lower section, B, comprises side boards, B', and end supports, C. The side boards have bearings $b'$ in their upper edges for the trunnions of the cylinder. The supports C are secured between the side boards, B', near the ends of the latter, and are provided with legs C', which extend downward and are bent laterally outward a sufficient distance so that their feet C² will rest in approximately the plane of the outer end of the discharging-trunnion of the cylinder, so that the machine may be conveniently turned onto its side, as indicated in dotted lines, Fig. 2. In practice I prefer to secure the feet C² on the same side of the machine with the discharge-trunnion to the floor or bench by staples C³ or similar expedients, as will be understood from Fig. 2. Manifestly, only those feet on the side before referred to need be extended laterally, as shown; but for uniformity in appearance and convenience in manufacture I prefer to make all the legs and feet alike.

The cylinder D has trunnions $d$ and $d'$, which are journaled in the bearings $b'\ b'$. The trunnion $d'$ is perforated longitudinally at $d^2$, so that water will readily flow thereout and the lumps of ice will be stopped. This trunnion may have a hand-crank attached to it, by which it may be revolved; but I prefer to fix on it a gear-wheel, E, meshed by a drive-pinion, E', having a suitable crank, and arranged about as shown in Fig. 1. The trunnion $d$ has an opening, $d^3$, made sufficiently large to admit the ice and salt, and on such trunnion I cast or suitably secure a hopper, F, usually made in the conical form shown. When the machine is in use, the opening $d^3$ is closed by a suitable plug, F.

The concave G has side plates, $g$, which project up on opposite sides of the cylinder, and its ends are flanged at $g'$, forming hooks, which catch over the supports C and secure the concave in place. This concave, it will be noticed, fits centrally between its ends snugly up against the lower side of the cylinder, and the portion in front of such cylinder serves as a feed-hopper, H, into which the cream or other article is placed. The direction of motion of the cylinder is indicated by the arrows.

The scraper I is located on the opposite side of the cylinder from the hopper H. One edge or end of this scraper presses against the cylinder, so as to scrape the frozen cream, &c., thereof, and its other end extends beyond the framing of the machine, so that it will discharge the frozen cream at a point outside of such framing, where it may be conveniently caught in a dish or other vessel set to receive it. It is preferred to secure this scraper pivotally on a bolt, J, which extends through one side B', thence through the scraper and the other side B', and is secured by a thumb or other suitable clamping-nut bearing against one of said side pieces, as shown. By this construction the scraper may be adjusted on the bolt to set it more tightly against the cylinder, when so desired.

In my machine it will be noticed the feed-hopper H is located below the axis of the cylinder. The object in this location is, that by it the cream, &c., placed in such hopper will, if not immediately frozen and taken up by the cylinder, be held in the hopper until frozen and taken up, thus avoiding any waste of material; also, by arranging the hopper and the scraper on opposite sides of the cylinder, the cream is subjected to a longer period on the cylinder, and is consequently better frozen than if such parts were in closer relation.

In preparing the machine for use it is turned on one side, as indicated in dotted lines, Fig. 2, the plug F removed, and the ice and salt supplied through the opening $f^3$. The plug is then replaced and the machine turned to position for use. Now, by turning the cylinder in the direction indicated, the cream or other article will be taken up by the cylinder and quickly frozen, so that by time it reaches the scraper it is thoroughly frozen and is discharged in flakes.

When the ice has melted, the machine may be again turned on its side, and the water will flow out of opening $d^2$, and ice may be resupplied through opening $d^3$.

While it is preferred to use ice and salt as the refrigerant, other well-known refrigerants may be employed without departing from the invention.

By the before-described construction it will be seen that the cylinder, the concave, and scraper may be conveniently detached from the framing in order to properly cleanse and sun the same, as is desirable.

Having thus described my invention, what I claim as new is—

1. A freezing-cylinder having a hollow trunnion fitted to admit the refrigerant and provided with a hopper supported on and revolving with the said trunnion, substantially as set forth.

2. As an article of manufacture, the hollow freezing-cylinder herein described, having trunnions at its opposite ends, one of said trunnions having an opening fitted to discharge water, and the other having an opening fitted to admit the refrigerant, and having its outer end flared, forming a hopper, substantially as set forth.

3. The combination of the supports C, the cylinder, and the concave having its ends provided with flanges hooked over the supports C, and having side plates projecting up on opposite sides of the cylinder, substantially as set forth.

4. The combination of the main frame, the cylinder supported therein and having hollow trunnions, one of which is adapted to permit the infeed of the refrigerant and the other the discharge of water, and legs secured at one end to the main frame, and provided at their other ends with feet adapted to be journaled to a support, whereby the device may be turned upon its side, substantially as set forth.

The above specification of my invention signed by me this 16th day of April, 1885.

ALBERT L. PLATT.

Witnesses:
SOLON C. KEMON,
CHAS. A. PETTIT.